United States Patent [19]

Wataya et al.

[11] Patent Number: 5,651,889

[45] Date of Patent: Jul. 29, 1997

[54] SLUDGE TREATMENT MEMBRANE APPARATUS

[75] Inventors: Sakae Wataya, Urayasu; Kimio Yamamoto, Ichihara; Hirokazu Shirage, Chofu; Kouji Irie, Ichikawa; Tadaaki Hashimoto, Sakura, all of Japan

[73] Assignee: Mitsui Petrochemical Industries, Ltd., Tokyo, Japan

[21] Appl. No.: 621,237

[22] Filed: Mar. 25, 1996

[51] Int. Cl.⁶ .................................................. B01D 63/00
[52] U.S. Cl. ............................. 210/321.75; 210/321.84; 210/231; 210/232; 210/346; 210/488
[58] Field of Search .................. 210/321.75, 321.84, 210/323.2, 195.2, 256, 791, 231, 232, 346, 488

[56] References Cited

U.S. PATENT DOCUMENTS

| | | | |
|---|---|---|---|
| 4,832,841 | 5/1989 | Gutman et al. | 210/321.89 |
| 5,192,456 | 3/1993 | Ishida et al. | 210/321.75 |
| 5,437,787 | 8/1995 | Ishida et al. | 210/256 |
| 5,482,625 | 1/1996 | Shimizu et al. | 210/321.75 |

*Primary Examiner*—Ana Fortuna
*Attorney, Agent, or Firm*—Rogers & Killeen

[57] ABSTRACT

A membrane apparatus includes a bubble supplying portion for supplying micro bubbles which is provided at a location in the vicinity of the entrance of a flow passage for raw liquid. Thus, the growth of a gel layer on a membrane surface can be prevented, and a large filtering amount can be maintained while preventing sludge from blocking the membrane. Moreover, since bubbles uniformly pass through the inter-membrane passages, sludge blocking can be evenly prevented over the entire surface of the membrane. When a flat membrane is used as the filtering membrane, there is provided an advantage of reducing the frequency of work for disassembling the frame and cleaning the membranes. A membrane treatment apparatus includes the membrane apparatus, an aeration apparatus, a circulating tank, and a filtrate pump. Since the relative density of raw liquid which has received bubbles in the membrane apparatus decreases, a difference in density is produced between that raw liquid and raw liquid which is newly supplied from the circulating tank to the passage and which contain no bubbles. Since this difference in density causes a flow of raw liquid, no power is needed for circulation. Accordingly, a circulating pump can be omitted so as to reduce costs including initial cost and operation cost.

2 Claims, 3 Drawing Sheets

FILTRATE

SLUDGE TREATMENT MEMBRANE APPARATUS

BACKGROUND OF THE INVENTION

1. Field of the Invention

The present invention relates to a membrane apparatus for filtering a raw liquid, and a membrane treatment apparatus employing the membrane apparatus to perform membrane treatment. Examples of the raw liquid include sludge in an aeration tank for biological treatment, sludge discharged from the aeration tank, concentrated sludge, waste water containing human excrement before being subjected to biological treatment, etc.

2. Description of the Related Art

Waste water containing organic substances, nitrogen, phosphorus, etc., which would contaminate oceans, rivers and the like is generally subjected to biological treatment to convert it into clean water and is then discharged into a river, for example.

As a means for separating the solid and liquid components of a reaction mixture resulting from biological treatment, a settling tank of a gravity settling type has conventionally been used. However, in recent years, a membrane separating technique has been used so as to reduce installation space and facilitate maintenance.

In such a membrane separating technique, it is very important to constantly produce a filtrate for a prolonged period of time. However, the amount of filtrate unavoidably decreases with passage of time. It is considered that this problem is partly caused by separated concentrated substances which deposit on the surface of a membrane and form a gel layer. The gel layer grows and hinders the passage of liquid to be filtered. The gel layer is called a concentration polarization layer, and the thickness of the concentration polarization layer increases as the concentration of contaminants in sludge increases and as the amount of filtrate increases. Accordingly, in the membrane separating technique, reduction of the thickness of a concentration polarization layer and removal of a concentration polarization layer are quite important.

Membrane apparatuses are categorized into a flat membrane type and a tubular type, etc. based on the kind of a membrane used. They are also categorized into an out-tank type in which a membrane is installed outside an aeration tank and an in-tank type in which a membrane is installed within a tank, based on the location of membranes.

FIG. 4 shows a conventional membrane treatment apparatus employing a membrane apparatus of the out-tank type using a flat membrane. In FIG. 4, numeral 50 denotes a membrane apparatus, numeral 51 denotes a circulating tank for receiving sludge fed from an unillustrated aeration tank, and numeral 52 denotes a circulating pump. Numeral 53 denotes a frame which can be disassembled after unillustrated packing seals are removed therefrom. A plurality of membrane plates 54 are disposed within the frame 53 and are removably fixed thereto. Each membrane plate 54 consists of a membrane support member 57 having passages 55 and 56 at the upper and lower ends thereof, and membranes 58 which are attached to both faces of the membrane support member 57 with a clearance 57a. Numeral 59 denotes outlet ports through which a filtrate is drained. Numeral 60 denotes a sludge inlet, and numeral 61 denotes a sludge outlet. Numeral 62 denotes inter-membrane passages through which sludge or concentrated sludge flows.

Sludge in the circulating tank 51 is led to the sludge inlet 60 of the membrane apparatus 50 by the circulating pump 52. The sludge led to the membrane apparatus 50 flows into the inter-membrane passages 62 directly or via the passage (s) 56, so that the sludge is separated into concentrated sludge and filtrate. The filtrate is taken out to the outside of the membrane apparatus 50 through the outlet ports 59. The concentrated sludge is returned to the circulating tank 51 via the sludge outlet 61 and is mixed with sludge fed from the unillustrated aeration tank. The above-described circulation is repeated.

In the above-described conventional apparatus, sludge is caused to circulate through the inter-membrane passages 62 at a relatively high speed of about 2–2.5 m/s so as to prevent concentration polarization. However, since the circulation amount and pressure losses both increase, the power of the pump must be increased.

When the apparatus is operated while a pressure is applied to the inter-membrane passages, the amount of filtrate temporarily increases. However, this increases the growing speed of gel layers on the surfaces of the membranes, so that the amount of filtrate decreases. To maintain the amount of filtrate large, the power costs increase further.

In the flat membrane type, gel layers can be removed completely by removing unillustrated packing seals, disassembling the frame, and washing the membrane plates. Hence, even when blocking by sludge occurs, the performance of the membranes can be completely recovered. However, since disassembling and checking the membrane apparatus is dirty work, it is desired to reduce the frequency of such work.

Japanese Patent Application Laid-Open (kokai) No. 2-86893 discloses an in-tank flat membrane apparatus in which a flat membrane is immersed into sludge within an aeration tank, and suction is applied to sludge using a suction pump to obtain filtrate. Use of this apparatus decreases the power needed to produce a required amount of filtrate. In addition, by decreasing the amount of filtrate, the growing speed of gel layers can be decreased, and adhesion of sludge can be prevented by bubbles produced by aeration in the aeration tank.

In the in-tank flat membrane apparatus disclosed in that patent publication, since the distance between the air dispersing pipe and the membranes is large, most of bubbles do not enter inter-membrane passages. Therefore, sludge blocking occurs in some inter-membrane passages into which bubbles do not enter. Moreover, when sludge adheres to the membranes, the entire apparatus must be pulled out of the sludge for cleaning. This work is complex and dirty.

SUMMARY OF THE INVENTION

In view of the foregoing, a first object of the present invention is to provide a membrane apparatus which prevents growth of gel layers on membrane surfaces, which prevents blocking due to sludge while maintaining a large filtering amount, and which evenly prevents sludge blocking over the entire surface of membranes.

A second object of the present invention is to provide a flat membrane apparatus of an out-tank type which reduces the frequency of disassembly of the frame and cleaning of the membranes, thereby facilitating maintenance.

A third object of the present invention is to provide a membrane treatment apparatus which is operated without using a circulating pump, thereby decreasing costs.

Novel features of the present invention are set forth in the appended claims. However, the present invention itself, and further objects and advantages thereof will become clearer by the following description of the present invention and a preferred embodiment thereof.

DESCRIPTION OF THE INVENTION AND PREFERRED EMBODIMENTS

Figure 1:
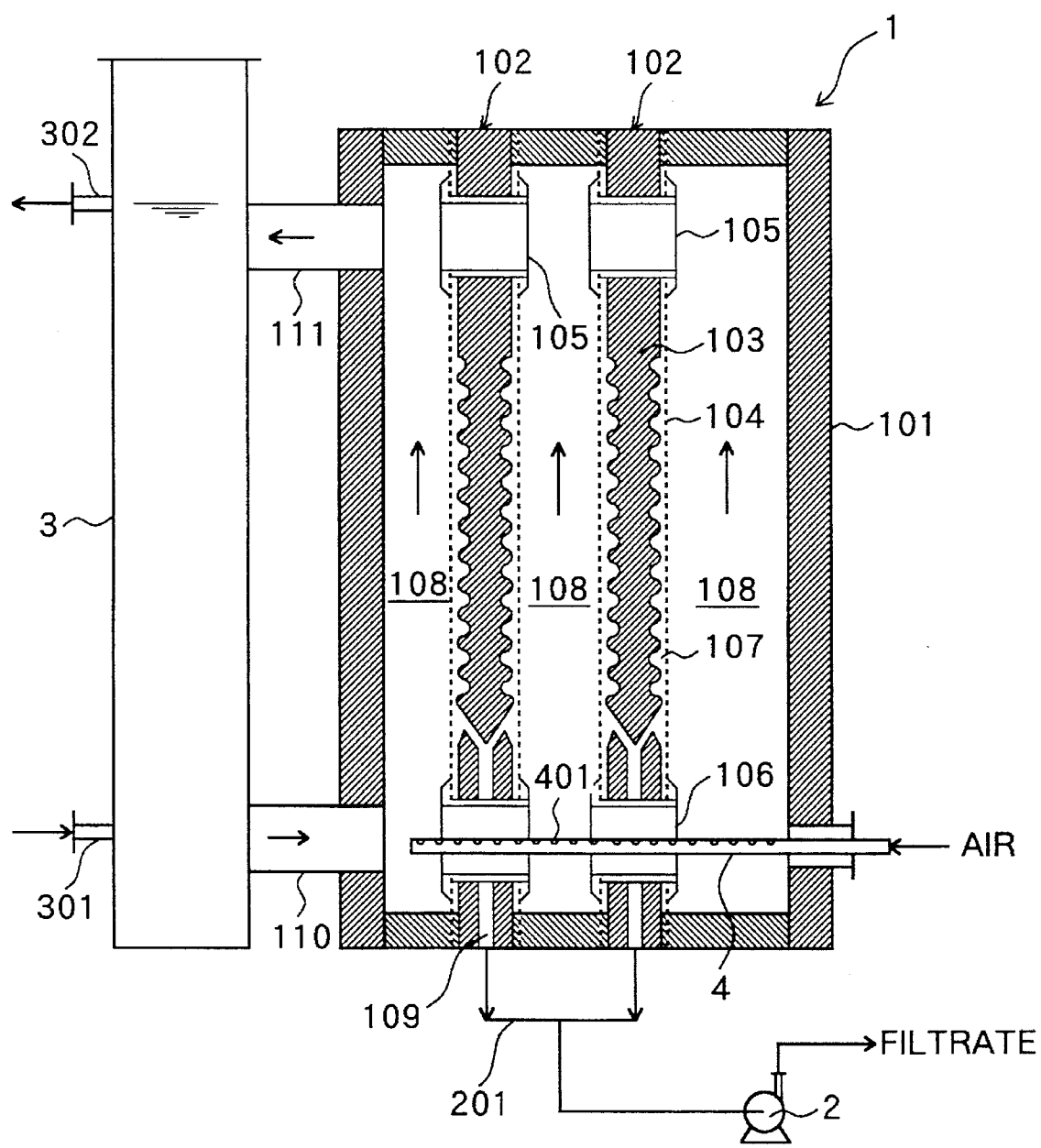
FIG. 1 is a schematic cross-sectional view showing an example of a membrane treatment apparatus in which a membrane apparatus according to the present invention is incorporated.

The present invention will now be described in detail.

First, a description will be given of the inventors' idea regarding the basic structural elements of the present invention and effects provided thereby.

In a membrane apparatus according to the present invention, a portion for supplying micro bubbles is provided in the vicinity of an entrance of a flow passage. In this specification, such a portion for supplying micro bubbles is referred to as a "bubble supplying portion", and the term "bubble supplying portion" encompasses part of a porous pipe from which micro bubbles are discharged, and an opening, hole or the like formed in a pipe from which micro bubbles are discharged, while not being limited thereto.

In the membrane apparatus, the flow of raw liquid is caused by micro bubbles discharged from the bubble supplying portion. In addition, the micro bubbles hit and/or scrape a membrane surface by themselves or in cooperation with the raw liquid. Accordingly, the growth of a gel layer on the membrane surface can be prevented, and a large filtering amount can be maintained while preventing sludge from blocking the membrane. Moreover, since bubbles uniformly pass along the membrane surface, sludge blocking can be evenly prevented over the entire surface of the membrane.

In a membrane apparatus using a flat membrane as a filtering membrane, the above-described hitting phenomenon and/or scraping phenomenon occurs in an inter-membrane passage. Accordingly, there is provided an advantage of reducing the frequency of work for disassembling the frame and cleaning the membranes, which is peculiar to the flat membrane apparatus, in addition to the above-described advantages, i.e., protecting of growth of a gel layer on a membrane surface, maintaining a large filtering amount, preventing blocking due to sludge, and evenly preventing sludge blocking over the entire membrane.

In a membrane treatment apparatus comprising at least the above-described membrane apparatus, a circulating tank and a filtrate pump, the relative density of raw liquid in the membrane apparatus which contains bubbles decreases, so that a difference in density is produced between that raw liquid and raw liquid which is newly supplied from the circulating tank to the passage and which contain no bubbles. Since this difference in density causes a flow of raw liquid, no power is needed for circulation. Accordingly, a circulating pump can be omitted so as to reduce costs including initial cost and operation cost.

Next, embodiments of the present invention will be described.

In a membrane apparatus according to the present invention, a flow passage for circulating raw liquid is provided on one side of a filtering membrane, and an outlet port for draining a filtrate is provided on the other side of the filtering membrane. A membrane apparatus having these features may be manufactured as an out-tank type membrane apparatus using a flat membrane or a tubular membrane, or as an in-tank type membrane apparatus using a flat membrane or the like. As described before, in the out-tank type, the membrane apparatus is installed outside a tank such as an aeration tank of a biological treatment facility. In the in-tank type, the membrane apparatus is immersed in sludge within an aeration tank.

In the present invention, it is essential that a bubble supplying portion for supplying micro bubbles be provided at a location in the vicinity of the entrance of a flow passage of raw liquid. The phrase "a location in the vicinity of the entrance of a flow passage" means an arbitrary location at which the bubble supplying portion can be provided and which does not separate from the flow passage, as in the conventional membrane apparatus.

Preferably, the membrane apparatus according to the present invention is of an out-tank type and includes a plurality of flat membranes such that they are disposed to extend vertically, and that an inter-membrane passage and an outlet port for draining a filtrate are alternately formed in spaces formed between the flat membranes. More specifically, the membrane apparatus according to the present invention is a flat membrane apparatus having a structure in which flat membranes can be attached and detached, i.e., a structure in which the frame can be dismantled. The flat membrane apparatus preferably comprises a bubble supplying portion for supplying micro bubbles which is disposed at a lower end portion of the inter-membrane passage.

Although the above-described membrane apparatus can be used in an arbitrary manner, it is preferably used in a membrane treatment apparatus of the present invention.

A membrane treatment apparatus according to the present invention comprises the above-described flat membrane apparatus, an aeration apparatus for supplying air to the bubble supplying portion of the membrane apparatus, a circulating tank which is connected to an inlet of the membrane apparatus through which concentrated raw liquid is introduced into the interior of the membrane apparatus, and to an outlet of the membrane apparatus through which the concentrated raw liquid is discharged from the interior of the membrane apparatus, and a filtrate pump for imbibing a filtrate by suction. Although the flat membrane apparatus and the circulating tank may be separately provided, it is preferred to integrate them to reduce the installation space.

No restriction is imposed on the filtering membrane used in the present invention, insofar as filtration can be performed at a relatively low pressure. Ultrafiltration membrane, microfiltration membrane, or the like can be used as the filtering membrane. In the present invention, each membrane preferably work with a differential pressure of 1 kg/cm$^2$ or less between the raw liquid side and the filtrate side of the membrane.

In the present invention, examples of the raw liquid include sludge in an aeration tank for biological treatment, sludge fed from the aeration tank (sludge from a circulation tank or the like), concentrated sludge, waste water containing human excrement before being subjected to biological treatment, a reaction mixture resulting from coagulating reaction caused by adding a coagulant, or concentrated sludge and its separated water obtained by separating the reaction mixture in a settling tank.

Also, the membrane apparatus according to the present invention can be used for recycling waste water, collecting valuable substances, utilizing rain, various separation/concentration treatments, various separation/concentration/purification treatments, and the like. Accordingly, the raw liquid which may be treated by the present invention include various kinds of liquids insofar as the objects of the present invention can be attained.

Next, embodiments of the present invention will be described with reference to the drawings.

In FIG. 1, numeral 1 denotes a membrane apparatus, numeral 2 denotes a filtrate pump, and numeral 3 denotes a circulating tank. Numeral 101 denotes a frame of the membrane apparatus which can be dismantled, and a plurality of membrane plates 102 are disposed within the frame 101 and are removably fixed thereto.

Each membrane plate 102 consists of a membrane support member 103 having openings at the upper and lower ends thereof, and flat membranes 104 which are attached to both faces of the membrane support member 103. The flat membranes 104 are fixed by seal rings 105 and 106 provided in the upper and lower passages.

The membrane support member 103 is formed of a plate material, and many depressions and protrusions are formed on both sides of the membrane support member 103. Numeral 107 denotes a clearance formed between each flat membrane 104 and the membrane support member 103. Numeral 108 denotes inter-membrane passages which are formed between the membrane plates 102 and through which raw liquid such as sludge or concentrated sludge flows.

To prevent the blockade of the inter-membrane passages, the inter-membrane passages preferably have a width equal to or greater than 3.0 mm, more preferably equal to or greater than 4.5 mm. From the viewpoint of the volume efficiency of the membrane apparatus, the width of the inter-membrane passages is preferably 8.0 mm at most, more preferably 6.0 mm at most.

Numeral 109 denotes an outlet port for draining a filtrate, which is connected to the filtrate pump so as to imbibe a filtrate by suction. Numerals 110 and 111 denote a sludge inlet and a sludge outlet, respectively, which are connected to the circulating tank 3.

Numeral 4 denotes an aeration pipe connected an unillustrated aeration apparatus such as a blower or a compressor, and the aeration pipe 4 has a plurality of fine holes at locations in the vicinity of the sludge inlet port, or at a lower end portion of the inter-membrane passages 108. These fine holes serve as bubble supplying portions 401 of the present invention for supplying micro bubbles. Specifically, a plurality of fine holes are formed in a pipe made of metal, a hose made of a resin, or the like. Accordingly, when the aeration pipe 4 is inserted into the passages formed in the seal rings 106 and air is supplied to the aeration pipe 4, micro bubbles are supplied from the bubble supply portions to the inter-membrane passages 108. Preferably, the fine holes have a diameter of 100–1000 μm.

In the present invention, the bubble supplying portions of the aeration pipe may be formed of porous rubber, porous resins, porous metal, porous ceramics, or other porous materials. In this case, the bubble supply portions are formed by a plurality of pores of the porous material. Preferably, the diameter of the pores is 100–1000 μm.

The plurality of bubble supply portions 401 of the aeration pipe 4 are provided at such locations that micro bubbles supplied from the bubble supply portions 401 directly move upward along the inter-membrane passages.

Figure 2:
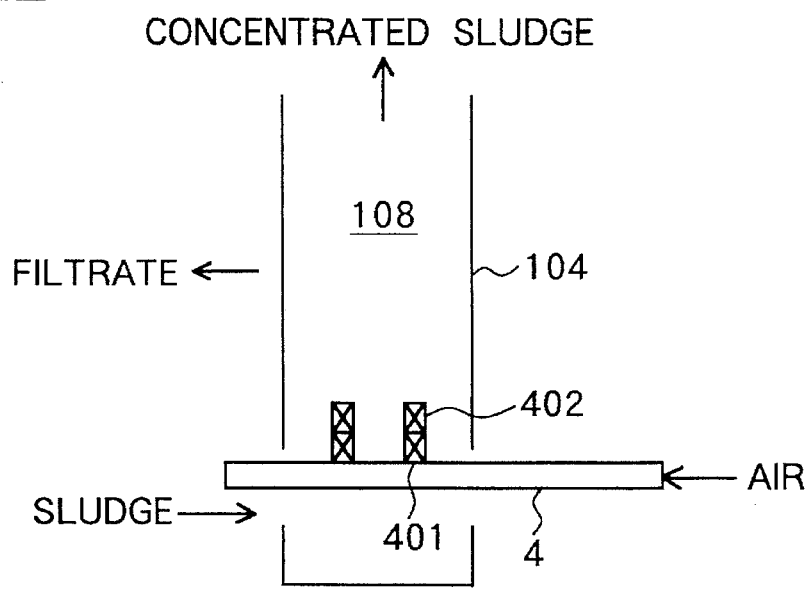
FIG. 2 is a schematic view showing an improved example of the aeration pipe.

Further, as shown in FIG. 2, it is preferred that the diameter of the openings serving as the bubble supply portions 401 be increased and nozzles 402 for generating micro bubbles be attached to the openings. Examples of the nozzles include pipes into which mixing members are incorporated, porous ceramics, and sponge.

The distance between the membranes is preferably determined such that generated bubbles securely and uniformly rise along the inter-membrane passages 108. The wavy protrusions and depressions formed on both side surfaces of each membrane support member 103, to which membranes are attached, assist bubbles rising along the inter-membrane passage 108 to uniformly disperse within the entire cross section of each inter-membrane passage 108.

A sludge inlet 301 is provided at the lower portion of the circulating tank 3, and a sludge outlet 302 is provided at the upper portion thereof. A vent or the like may be added to the circulating tank 3 for deaeration. Deaeration may be performed after sludge (raw liquid) is taken out of the circulating tank 3. In the present embodiment, deaeration is performed within the circulating tank.

Sludge from the circulating tank 3 flows into the interior of the membrane apparatus 1 via the sludge inlet 110, and flows into the inter-membrane passages 108 directly or via the passage(s) of the seal rings 106 provided at the lower portion of the membrane apparatus 1. The sludge then rises together with micro bubbles supplied from the bubble supplying portions 401. The sludge containing bubbles reaches the sludge outlet 111 directly or via the passage(s) of the seal rings 105 provided at the upper portion of the membrane apparatus 1. The sludge then returns to the circulating tank 3.

The sludge flowing from the membrane apparatus 1 is subjected to deaeration within the circulating tank 3. Accordingly, sludge fed from the circulating tank 3 to the interior of the membrane apparatus 1 via the sludge inlet 110 does not contain bubbles substantially.

Circulation of sludge is performed without using a power source such as a circulating pump. That is, sludge circulates due to the difference in density between the sludge supplied from the circulating tank 3 to the membrane apparatus 1, and the sludge which exists in the inter-membrane passages 108 and contains bubbles.

The circulating tank 3 plays an important role as an air/liquid separating tank for circulation of sludge. Since the membranes can be easily cleaned by discharging sludge and adding water, no special cleaning apparatus is needed. Also, chemical cleaning can be performed by adding chemicals into the circulating tank 3.

Micro bubbles supplied to the inter-membrane passages 108 not only promotes the circulation of sludge due to the difference in density between the circulating tank 3 and the membrane apparatus 1, but also produces turbulent flows, thereby preventing growth of gel layers on the membrane surfaces.

Even during a cleaning operation using water, the supply of bubbles is continued. This makes easier to clean gel layers and sludge deposited and grown on the membrane surfaces.

A filtrate is taken out of the membrane apparatus 1 by suction using the filtrate pump 2 connected to the membrane apparatus 1 via a filtrate collecting pipe 201. When the filtrate is imbibed, the concentration of sludge circulating within the membrane apparatus 1 increases. To prevent the concentration of sludge from increasing, sludge is supplied to the circulating tank 3 through the sludge inlet 301, while part of sludge is overflowed from the circulating tank 3 through the sludge outlet 302 so as to return it to an unillustrated circulating tank for an ultrafiltration membrane. This prevents the concentrations of sludge and concentrated substances within the membrane treatment apparatus from excessively increasing.

In the above-described embodiments, an example was described in which a plate member having wavy protrusions and depressions on both sides thereof is used as a membrane support member. However, the present invention is not limited thereto, and each membrane support member may be made of a porous plate material, or a plate made of synthetic fibers.

EXAMPLES

Next, the present invention will be described further with reference to test examples, which should not be construed as limiting the invention in any manner.

(1) Test Sample

Activated sludge in a biological treatment tank of a human excrement treating facility was used as raw liquid, and the concentration of the sludge was 10,000–15,000 mg/liter. The temperature of the sludge was 32°–35° C.

(2) Apparatus Tested

The apparatus as shown in FIG. 1 was tested. The model of the apparatus and the constitution of membranes were as follows:

| | |
|---|---|
| Model of membrane apparatus: | UFP-71 (product of Mitsui Petrochemical Industries, Ltd.) |
| Constitution of membranes: | 1S-31P (number of membrane plates: 30, membrane surface area: 10.5 m$^2$) |

The model of membranes used in the membrane apparatus and the cut-off molecular weight of the membranes are as follows:

| | |
|---|---|
| Model of membranes: | IRIS 3038 (material: polyacrylonitrile) |
| Cut-off molecular weight of the membranes: | 20,000 |

30 membrane plates were set such that first ten membrane plates had an inter-membrane distance of 3.0 mm, second ten membrane plates had an inter-membrane distance of 4.5 mm, and last ten membrane plates had an inter-membrane distance of 6.0 mm.

The aeration pipe having bubble supplying portions was formed of porous synthetic resin tube having an inner diameter of 16.5 mm and an outer diameter of 21.0 mm. The pore diameter of the bubble supplying portion of the aeration pipe was approximately 300 μm.

Sludge (raw liquid) was supplied at a rate of 2 m$^3$/hr. A filtrate was produced by suction filtration.

The flux of imbibed filtrate by suction was selectively set to 1) 20 liters/m$^2$/hr, and 2) 30 liters/m$^2$/hr.

(3) Results of Tests

Test 1

While maintaining the amount of filtrate constant, variations in the suction pressure at that time was measured so as to obtain basic data for continuous stable operation. Based on the basic data, variations in the degree of sludge blocking to the membranes with passage of time and with variation in the inter-membrane distance were observed.

Figure 3:
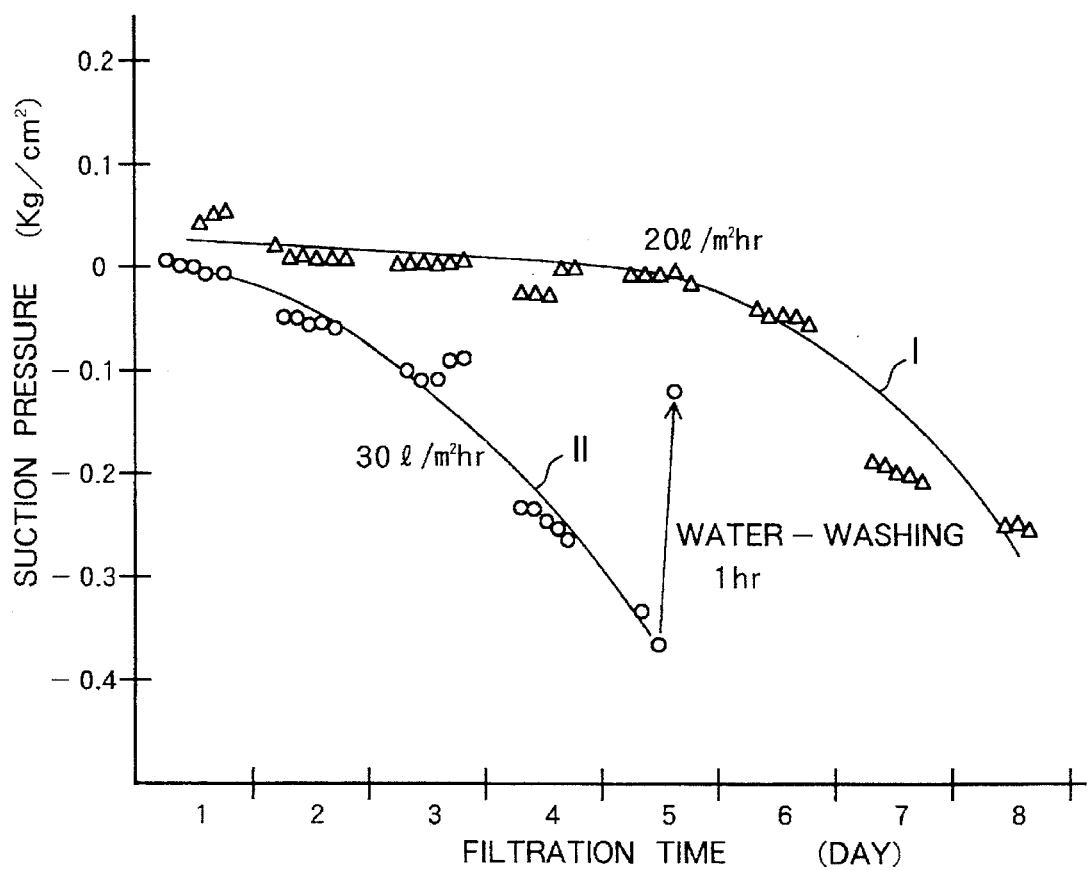
FIG. 3 is a graph showing the result of a test.
Figure 4:
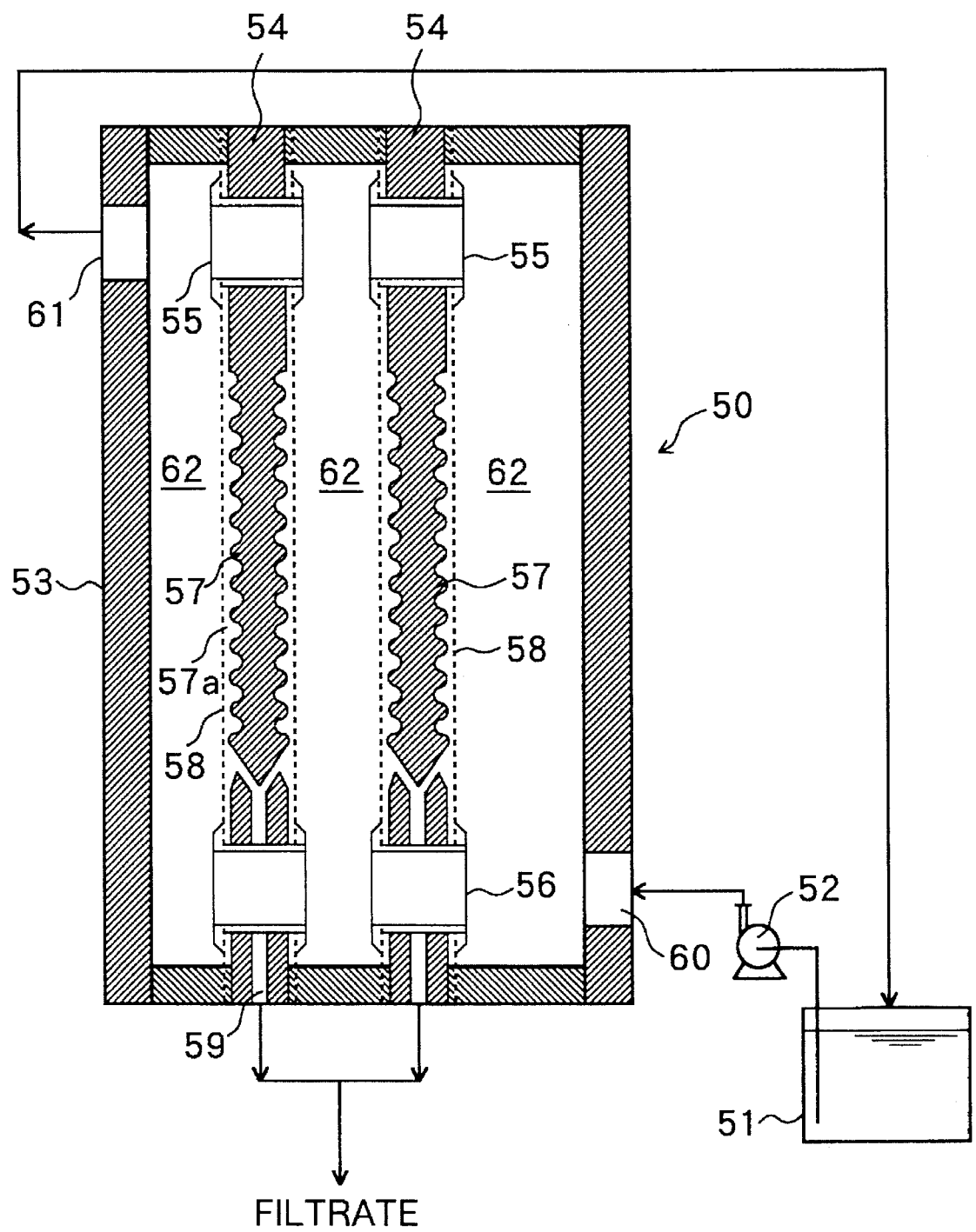
FIG. 4 is a cross-sectional view showing a conventional membrane apparatus.

FIG. 3 shows the results of the test.

In FIG. 3, curve I shows the relationship between the suction pressure and the filtration time when the flux of imbibed filtrate was set to be 20 liters/m$^2$/hr, while curve II shows the relationship between the suction pressure and the filtration time when the flux of imbibed filtrate was set to be 30 liters/m$^2$/hr.

As is apparent from FIG. 3, continuous operation was possible for about 4 days in the case of 30 liters/m$^2$/hr (curve II), and for about 1 week in the case of 20 liters/m$^2$/hr (curve I). This indicates that the flux is preferably set to be small for continuous operation for a long period of time.

An operation in which the flux of suction filtration was set to be 30 liters/m$^2$/hr was stopped when four days had elapsed, and was started again after cleaning with water for 1 hour (see day 5 of curve II). In this case, the suction pressure recovered from −0.37 kg/cm$^2$ to −0.12 kg/cm$^2$. This demonstrated that remarkable water-washing effect can be attained.

Three groups of membrane plates having inter-membrane distances of 3.0 mm, 4.5 mm and 6.0 mm, respectively were built in a single unit, and a continuous test was performed. Although test results varied depending on suction filtration fluxes, slight adhesion of sludge was observed in the groups having inter-membrane distances of 3.0 mm or 4.5 mm. In the group having an inter-membrane distance of 6.0 mm, adhesion of sludge was not observed, and the surface was very clean.

When the continuous operation was stopped, sludge in the circulating tank was drained and aeration cleaning was performed for 1 hour while pouring water. Sludge was completely washed out and removed. Further, thin gel layers deposited on the membranes were mostly removed.

Test 2

Based on the favorable results of Test 1, the membrane treatment apparatus was operated under the following operational conditions. Inter-membrane distance: 4.5 mm, the number of membrane plates: 60, and suction filtration flux: 30 liters/m$^2$/hr. The operation was stopped once a day before the suction pressure is decreased for a cleaning with water. As a result, operation was stably continued for about 60 days.

Test 3 (Comparison)

To confirm the effect of sludge circulation by aeration and the effect of preventing adhesion of sludge, variations in the suction pressure was tested in a state in which the membrane treatment apparatus was operated while aeration was stopped.

Immediately after the beginning of the test, the suction pressure started to decrease, and the operation became unable to continue when only 16 minutes had elapsed after the start of the test. When the filtration test was resumed after water washing (1 hour), the suction pressure recovered to the initial level. However, in the second cycle, the operation became unable to continue when 13 minutes had elapsed, as in the first cycle. When the frame was dismantled in that state, the entire surface of all the membranes was blocked by sludge. The adhered sludge had a very high viscosity, and stuck and adhered to the membrane surface.

What is claimed is:

1. A membrane apparatus comprising:

a plurality of membrane plates disposed within a frame of the membrane apparatus which can be dismantled and removably fixed to said frame;

each membrane plate consists of a membrane support member having openings at the upper and lower ends portion, and flat membranes attached to both faces of said membrane support member;

inter-membrane passages formed between said membrane plates;

an outlet port for draining a filtrate provided between said membrane support member and said flat membranes; and an aeration pipe supplying micro bubbles inserted into the opening located at the lower end portion of said membrane plate.

2. A membrane treatment apparatus comprising: a membrane apparatus which comprises a plurality of flat filtering membranes having a support member disposed to extend vertically, a closed frame supporting ends of said membranes, said membrane can be dismanteled from said frame, an inter-membrane passage and an outlet for draining a filtrate alternatively formed in spaces formed between said flat filtering membranes, and a bubble supplying portion for supplying micro bubbles disposed at a lower end portion of said inter-media membrane passage;

aeration apparatus for supplying air to said bubble supplying portion;

a circulating tank for deaerating concentrated liquid discharged form a sludge outlet provided at the upper portion of said membrane apparatus, and for delivering said deaerated concentrated liquid to into a sludge inlet provided at the lower portion of said membrane apparatus; and a filtrate pump for imbibing filtrate by suction.

* * * * *